(12) United States Patent
Immendorf et al.

(10) Patent No.: US 8,229,368 B1
(45) Date of Patent: Jul. 24, 2012

(54) SYSTEMS FOR DETECTING AND LOCATING INTERFERENCE SOURCES

(75) Inventors: Chaz H Immendorf, Mill Creek, WA (US); Eamonn F Gormley, Redmond, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 344 days.

(21) Appl. No.: 12/434,068

(22) Filed: May 1, 2009

Related U.S. Application Data

(60) Provisional application No. 61/089,802, filed on Aug. 18, 2008.

(51) Int. Cl.
*H04B 1/44* (2006.01)
(52) U.S. Cl. .................. 455/78; 455/63.1; 455/67.13
(58) Field of Classification Search .................. 455/78, 455/63.1, 67.13
See application file for complete search history.

(56) References Cited

U.S. PATENT DOCUMENTS

2008/0056201 A1* 3/2008 Bennett ..................... 370/334
* cited by examiner

*Primary Examiner* — Lincoln Donovan
*Assistant Examiner* — Shikha Goyal

(57) ABSTRACT

A data communications system includes a controller device and multiple client devices in data communications with each other over a data communications network. The controller device is configured to issue an instruction to a portion of the client devices that instructs them to acquire an interference characteristic associated with one or more external interference source. The interference characteristic may be measured interference magnitudes associated with a frequency of data communications over the data communications link. The portion of client devices transmits the measured interference magnitudes to the controller device. The controller device then determines a location of one or more interference sources based on the transmitted data.

19 Claims, 5 Drawing Sheets

SYSTEMS FOR DETECTING AND LOCATING INTERFERENCE SOURCES

CROSS REFERENCE TO RELATED APPLICATIONS

The present application claims the benefit of U.S. Provisional Application No. 61/089,802, filed Aug. 18, 2008.

FIELD OF THE INVENTION

The present invention generally relates to systems and methods for detecting and locating various data communications interference sources by utilizing capabilities associated with existing, distributed network communications devices. Control processes for detecting and locating interference sources are fully automated and configurable from one or more controller device locations.

BACKGROUND OF THE INVENTION

Wireless data communication networks today typically involve data transmission of modulated information signals from one or more network controller devices to one or more remote client devices, and back, over various network communications links. Several distinct architectures have been deployed to meet the ever-increasing demands of modern wireless communications systems. Accordingly, these wireless data communications networks may vary in both access techniques and carrier modulation techniques. For example, modern cellular communications networks have been deployed according to frequency division multiple access, time division multiple access, and code division multiple access. Further, cellular communications networks typically employ various analog and/or digital modulation techniques, including: amplitude, frequency and/or phase modulation, and amplitude, frequency and/or phase shift-key modulation. Regardless of a particular wireless communication network's architecture or topology, these networks all share a common problem: communications degradation caused by extraneous energy sources unlawfully or unintentionally operating on frequencies dedicated for particular network communication channels.

Network operators often expend significant resources in order to license and broadcast over a dedicated communications frequency spectrum. Theoretically, this license awards the operator exclusive access to the licensed spectrum across a specific geographic region or area. Based on their exclusivity rights, operators may advantageously plan where and how they wish to allocate network resources, including, but not limited to: network controllers (e.g., network switching centers and/or network managers), databases, basestations, gateways, signal repeaters, etc. Operators within a network may also use their proprietary rights to determine which frequencies to employ at each basestation within a particular network topology. In this way, licensed operators can effectively optimize the design of their data communications networks to maximize system integrity and throughput.

Unfortunately, unlicensed users often purposefully or inadvertently operate external devices that that emit electromagnetic energy over a licensed frequency or frequency spectrum. These operations can cause unwanted electromagnetic interference that negatively affects the performance of various network resources. This rogue interference can degrade and/or add noise to data communications between two or more network devices (e.g., communications between a basestation and remote client devices) over dedicated communications channels. In some cases, the interference sources may be static in nature (e.g., always present) and in other cases the interference sources may be dynamic in nature (e.g., with only an intermittent presence).

In the case of cellular communications networks, one or more cellular interference sources may individually or collectively reduce the quality of service (QOS) characteristics associated with one or more cellular network users. QOS metrics affected by such interference may include, but are not limited to, communications quality, queuing delay, information loss, dropping existing network sessions, blocking new network sessions, etc. Generally, the degradation of various QOS metrics reduces cellular network throughput.

In order to maintain an acceptable QOS experienced by network users, it is desirable to remove all detectable sources of static and dynamic interference that may affect a given network's or network sector's (interchangeably disclosed as a network "cell") throughput. It should be understood by those skilled in the art that a network sector or cell generally includes a boundary-enclosed subregion within a larger data communications network. This subregion may include, but is not limited to, one or more cell basestations and multiple client devices in data communications with the basestation(s) over a predetermined, regionally-allocated frequency spectrum.

In the past, attempts have been made to determine interference sources at the basestation level, such that one or more network basestations were capable of detecting a broad regional area (e.g., a particular network cell), wherein an interference source may be operating. However, this high-level detection still requires a significant amount of manual intervention for further pin-pointing the location of one or more sources of interference (e.g., requiring an operator to drive a vehicle, adapted with expensive interference measurement equipment, around a network sector, taking measurements, to precisely determine a specific interference source location). Particularly with dynamic interference sources, this type of detection generally requires a significant amount of detective work on the part of a network authority to determine a location of an intermittent interference source.

Therefore, there continues to be a need for improved data communications systems and methods that can effectively detect and precisely and accurately locate both static and dynamic interference sources within or between affected cells of any data communications network topology. It would be beneficial if this solution could minimize the manual intervention required for precise determination of interference source locations. Further, it would be beneficial if these systems and methods could be fully automated and centrally configured by a network controller device.

SUMMARY OF THE INVENTION

In overcoming the above disadvantages associated with modern data communication systems, a data communications system in accordance with the present invention includes, but is not limited to, a controller device and multiple client devices in data communications with each other over a data communications network. The controller device is configured to issue an instruction to a portion of the client devices that instructs them to acquire an interference characteristic associated with a particular interference source.

In accordance with an aspect of the invention, the acquired interference characteristic includes a measured interference metric associated with the interference source.

In accordance with a further aspect of the invention, the measured interference metric is an interference magnitude associated with a frequency on which data communications take place over the data communications link.

In accordance with another aspect of the invention, the instruction also instructs the portion of client devices to transmit the measured interference metric to the controller device.

In accordance with yet another aspect of the invention, the controller device determines a location of the interference source based on the transmitted measured interference metric.

In accordance with a further aspect of the invention, the controller device schedules one or more frequency-based quiet times that coincide with a time period within which the instruction is to be carried out.

In accordance with yet another aspect of the invention, a data communications device that communicates data over a data communications network includes a processor, one or more memories, and a wireless transceiver. The processor receives a data communications instruction from the wireless transceiver that instructs the data communications device to measure interference metrics associated with an external interference source.

In accordance with a further aspect of the invention, the processor receives a data communications instruction from the wireless transceiver that instructs the data communications device to halt all wireless data communications that are not related to the measurement of the interference metric.

DESCRIPTION OF THE DRAWINGS

Preferred and alternative examples of the present invention are described in detail below with reference to the following Figure drawings.

DETAILED DESCRIPTION

Figure 1:
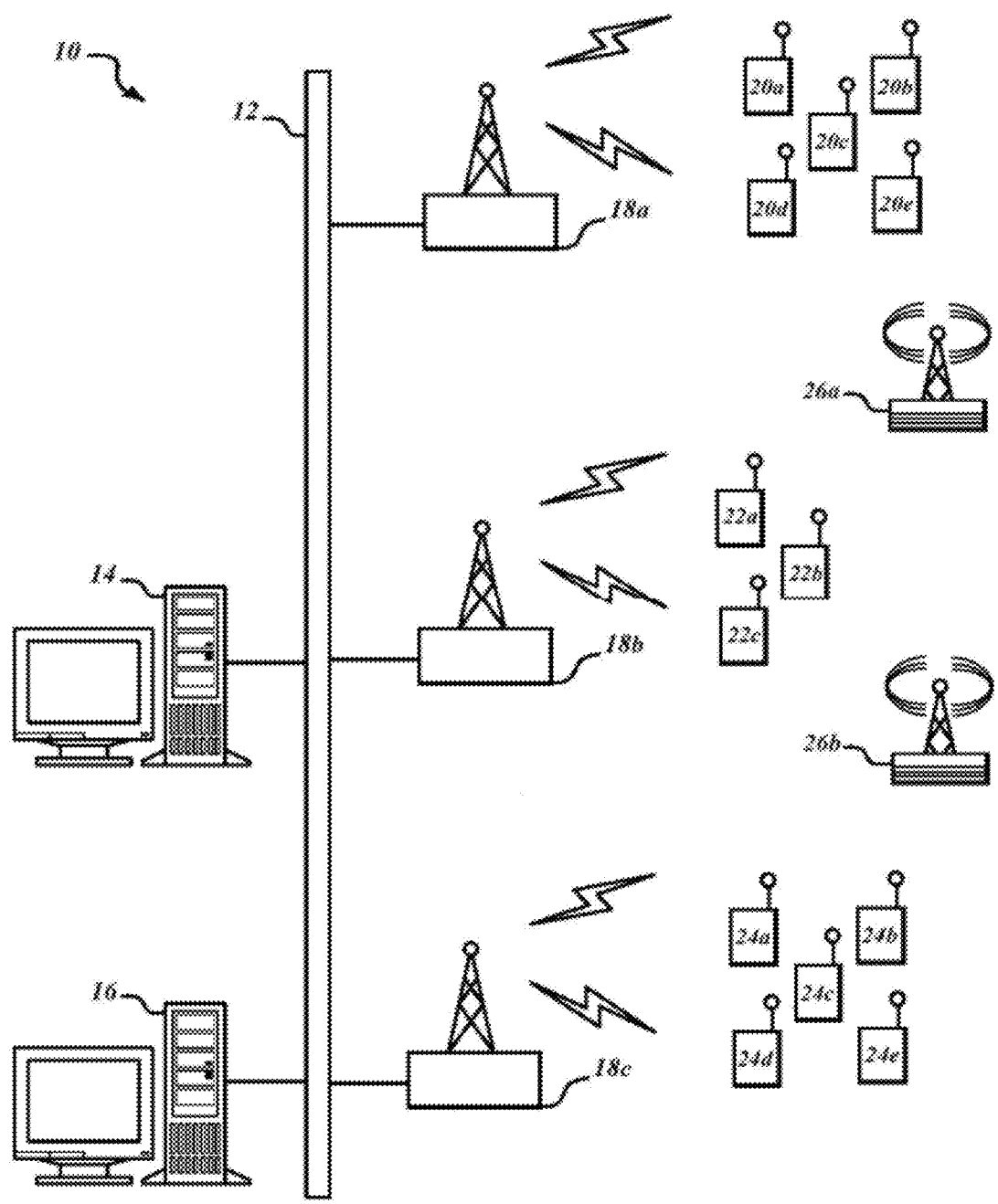
FIG. 1 illustrates a data communications system in accordance with an embodiment of the present invention.

In accordance with an exemplary embodiment of the present invention, FIG. 1 illustrates a networked data communications system 10, including: an Interference Detection and Location (IDL) server 14, a Radio Resource Manager (RRM) server 16, a backhaul network 12 that may be comprised of both wireline and wireless network components, multiple basestations 18a-c, multiple distributed client devices 20a-e, 22a-c, and 24a-e, and multiple external interference sources 26a-b. In an embodiment, the servers 14 and 16 may be configured to communicate with the basestations 18a-c via a wireline backhaul network 12. In another embodiment, the servers 14 and 16 may be configured to communicate with the basestations 18a-c via a wireless backhaul network 12. Further the basestations 18a-c may be configured to communicate with the distributed client devices 20a-e, 22a-c, and 24a-e via any well-know wireless communication airlink technology. The servers 14 and 16, basestations 18a-c, and distributed client devices 20a-e, 22a-c, and 24a-e may be configured to run any known operating system, including but not limited to, Microsoft Windows™, Mac OS™, Linux™, Unix™, or any common mobile operating system, including Symbian™, Palm™, Windows Mobile™, Mobile Linux™, MXI™, etc. The system computing devices 14, 16, 18a-c, 20a-e, 22a-c, and 24a-e may also be configured to communicate with each other using any suitable wireless or wireline communications technology known in the art.

In an embodiment, the backhaul network 12 may include, but is not limited to, any of the following communications technologies: optical fiber, coaxial cable, twisted pair cable, Ethernet cable, power-line cable, and any microwave point-to-point technology known in the art. In an embodiment, the basestations 18a-c may be configured to communicate with the distributed client devices 20a-e, 22a-c, and 24a-e via any Cellular Data Communications Protocol, including any common GSM or CDMA protocol. In an embodiment, the IDL server 14 and the RRM server 16 may be consolidated into one central device or location, such that the combined server functionality may be realized from a single control site. In another embodiment, the IDL server 14 and the RRM server 16 functionality may be further distributed amongst additional computing devices (including basestations) at one or more network locations, such that the combined server functionality may be distributed in accordance with the needs of particular network architectures.

The IDL server 14, RRM server 16, basestations 18a-c, and multiple distributed client devices 20a-e, 22a-c, and 24a-e, may also include standard computing software and hardware necessary for processing, storing, and communicating data amongst each other within the networked data communications system 10. The computing hardware may include, but is not limited to, one or more processors, volatile and non-volatile memories, user interfaces, and communications transceivers (e.g., including cellular, Wi-Fi, and satellite GPS technologies, consistent with modern PDA phone devices).

In an embodiment, a controller device, which could be any one of the IDL server 14, RRM server 16, or basestations 18a-c may include a computer-readable medium (e.g., any common volatile or non-volatile memory type) encoded with a set of computer readable instructions, which when executed, performs one or more control processes associated with the data communications resource management/scheduling processes, and the interference detection and interference source location processes of the present invention. In an embodiment, one or more client devices, which could be any of the multiple distributed client devices 20a-e, 22a-c, and 24a-e may include a computer-readable medium (e.g., any common volatile or non-volatile memory type) encoded with a set of computer readable instructions, which when executed, performs one or more interference detection and interference source location processes of the present invention.

For clarity and simplicity, only three cells are depicted in the networked data communications system 10 of FIG. 1. Each cell has an imaginary boundary region (not shown) encompassing an area including only a portion of the total networked system's distributed client devices 20a-e, 22a-c, and 24a-e. The first cell includes basestation 18a and distributed client devices 20a-e; the second cell includes basestation 18b and distributed client devices 22a-c; and the third cell includes basestation 18c and distributed client devices 24a-e. In alternate embodiments, distributed client devices may include any combination of stationary or mobile computing devices, having wireless communications capabilities (e.g., cellular phones, PDAs, e-books, laptop or ultra-portable computers, desktop computers, etc.). In an embodiment, external interference sources 26a may reside along a cell boundary between the first and second cells and external interference sources 26b may reside along a cell boundary between the second and third cells. Alternately either external interference source 26a or 26b may reside fully within the boundary region of any of the first, second, or third cells.

Figure 2:
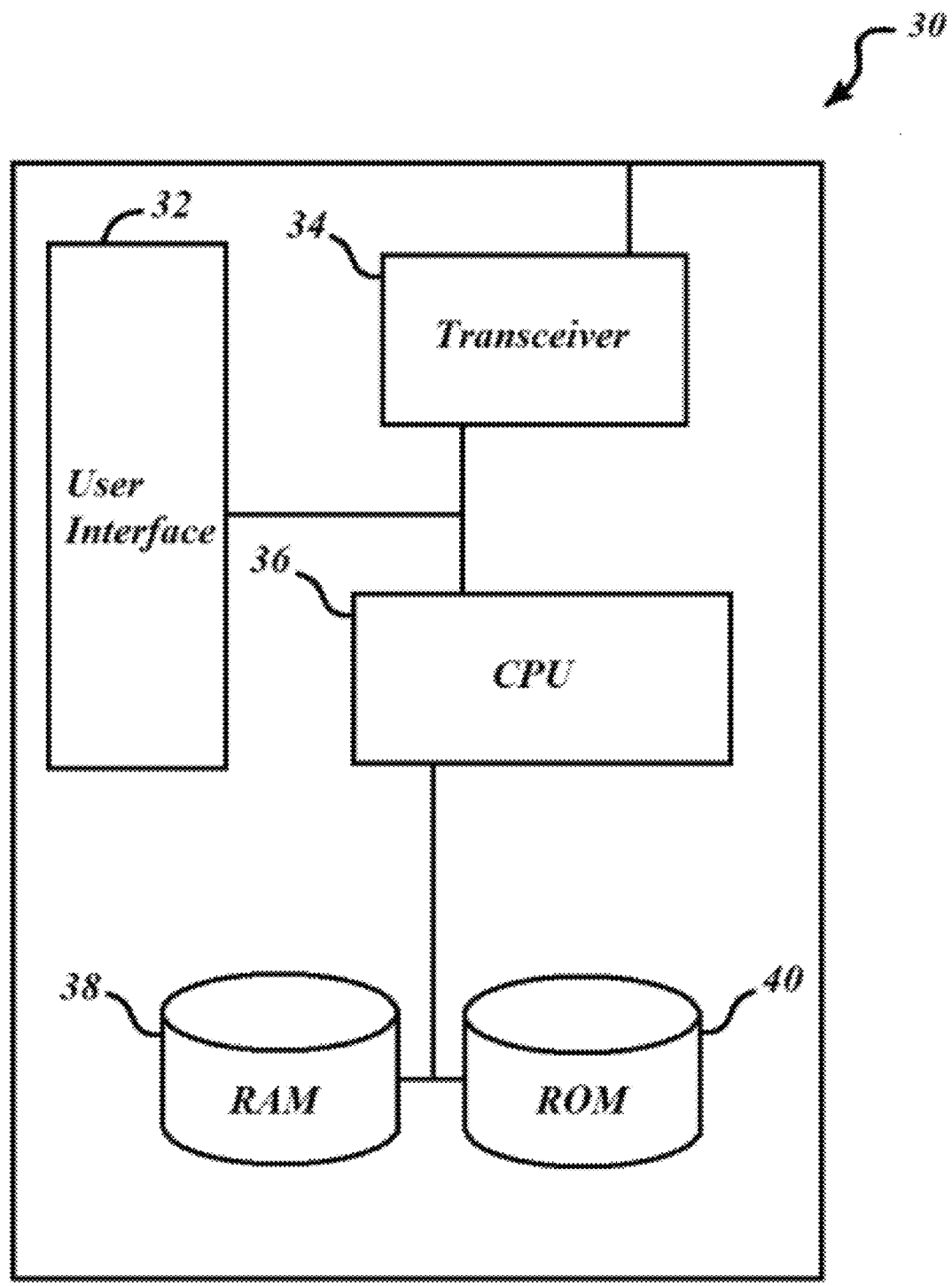
FIG. 2 illustrates a distributed client computing device of the data communications system in accordance with an embodiment of the present invention.

In accordance with an embodiment of the present invention, FIG. 2 illustrates a distributed client device 30 that could represent any of the distributed client devices 20a-e, 22a-c, and 24a-e of the data communications system 10 of FIG. 1. Generally, a distributed client device 30 is a mobile wireless communications device, but alternately, a client computing device 30 could be a static computing device also having wireless communications capabilities. Regardless of whether the client device 30 is static or mobile, the associated detection and location processes of the present invention would function the same. As would be understood by those skilled in the art, the distributed client device 30 of FIG. 2 is depicted as a high-level block diagram of a device whose illustrated hardware components may include multiple associated subcomponents necessary for real-world data communications. The distributed client device 30 includes, but is not limited to, the following hardware components: a central processing unit 36 that may include multiple processor and memory components (not shown), a random access memory (RAM) 38 that may include SRAM, DRAM, and/or dynamic flash memory components (not shown), a read only memory (ROM) 40 that may include EPROM, EEPROM and/or static flash memory components (not shown), a user interface 32 that may include any display or input/output device hardware known in the art, including keypads, touch screens, roller balls, etc. (not shown), and a transceiver unit 34 that may include one or more antennae, bandpass, lowpass, and/or highpass filters, signal data amplifiers, ADC and/or DAC converters, GPS transmitter/receivers, etc. (not shown).

The detection and location processes of the present invention may rely on independent or collaborative cellular frequency device measurements. For example, if an interference source 26a were located entirely within the first cell, the detection and location of the interference source 26a may only require the first cell's resources (e.g., client device measurements) to precisely locate the interference source 26a. However, if an interference source 26b were located between the second and third cell, the detection and location of the interference source 26b may require the combined second and third cell resources to precisely locate the interference source 26a. In an embodiment, the detection and location processes of the present invention may include simultaneous, automated detection and location of multiple interference sources within a single network cell or across multiple network cells.

In an embodiment, the RRM server 16 may include a data scheduler that may schedule part or all of the data transmissions within the networked data communications system 10. Data in this case may consist of voice or packet data. In another embodiment, the data scheduler can alternatively reside at individual basestations 18a-c, or in a more centralized location that can simultaneously schedule data transmissions for multiple basestations 18a-c. The RRM server 16 may instruct local or distributed data schedulers which wireless resources it should utilize to best optimize the performance of the data communications network 10.

The RRM server 16 may also instruct the data scheduler component(s) to periodically schedule frequency-based quiet times on a downlink during which all cell basestations 18a-c in a particular network region (e.g., regions associated with the first, second, and/or the third cells) are directed not to transmit data communications over a particular set or range of proprietary network frequencies. Any portion or portions of the distributed client devices 20a-e, 22a-c, and 24a-e may also be informed of the frequency-based quiet times within their cells so that they can make one or more sample measurements associated with extraneous static or dynamic energy sources. In an embodiment, the sample measurements may include power measurements in units of dBm (the power ratio in decibels of the measured power referenced to one milliwatt mW). As is well known in the art, a dBm metric is used in radio, microwave, and fiber optic networks as a convenient measure of absolute power because of its capability to express both very large and very small values in abbreviate form. The frequencies on which a portion of distributed client devices 20a-e, 22a-c, and 24a-e make measurements may or may not be the same frequencies that the subscriber terminals use for normal communications with their serving basestations 18a-c. As such, it may be necessary for the portion of distributed client devices 20a-e, 22a-c, and 24a-e making measurements to tune their transceivers 34 to allocated quiet frequencies, during a particular measurement interval and then tune back to a normal operating frequency after the quiet time period has elapsed.

Figure 3:
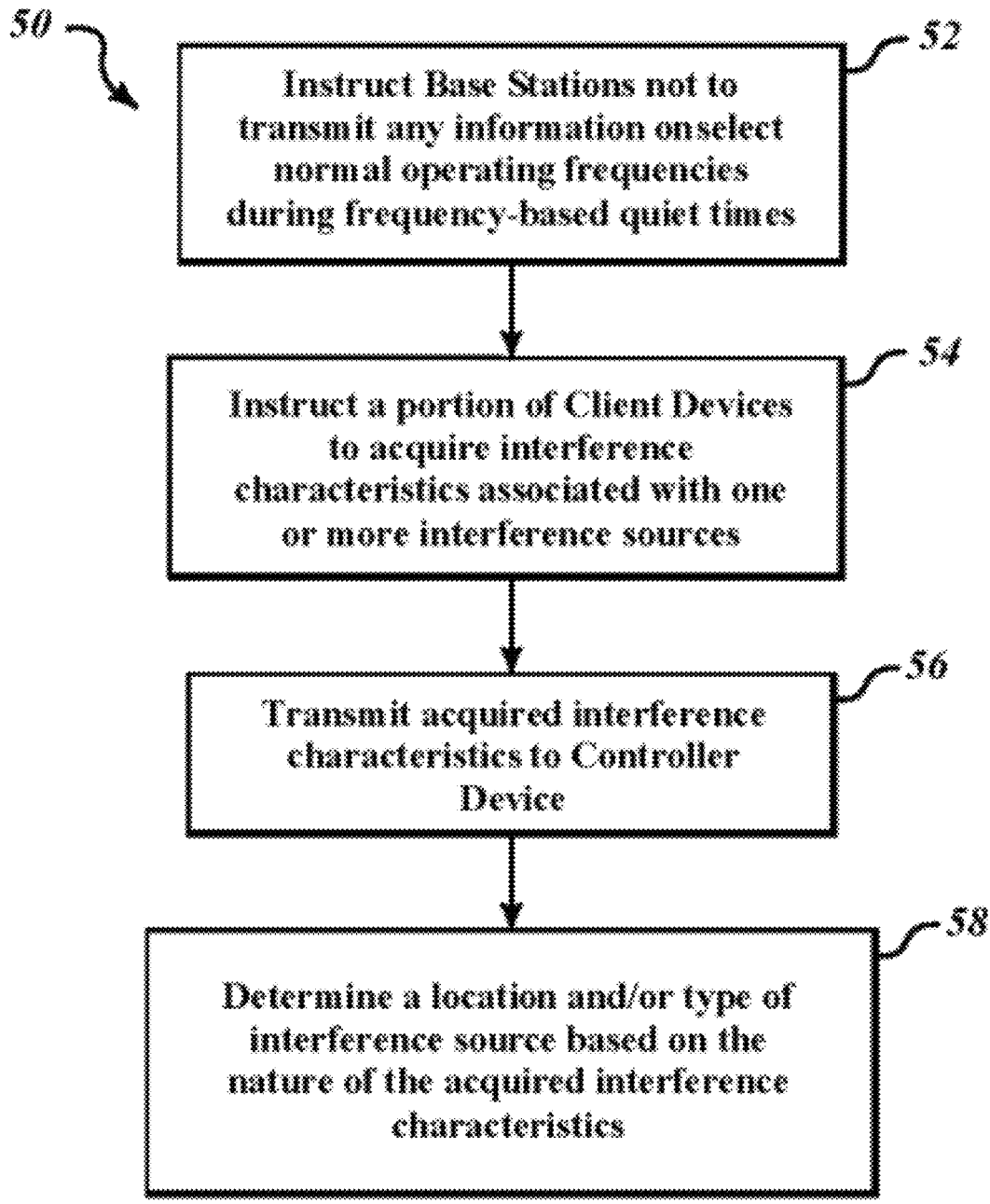
FIG. 3 illustrates a flow diagram of an interference source detection and location process in accordance with an embodiment of the present invention.

In accordance with an embodiment of the invention, FIG. 3 illustrates a flow diagram 50 associated with an interference source detection and location process. At block 52, one or more basestations 18a-c (e.g., basestations 18a and 18b) of interference-affected network cells (e.g., the first and second cells) may be instructed not to transmit any data on select normal operating frequencies during one or more scheduled frequency-based quiet times. Next, at block 54, a portion of distributed client devices 20a-e, 22a-c, and 24a-e (e.g., distributed client devices 20a-e, 22a-c) may be instructed to acquire interference characteristics associated with one or more interference sources 26a-b (e.g., interference attributed to interference source 26a), then at block 56, after a the frequency-based quiet time is complete, the portion of distributed client devices 20a-e, 22a-c, and 24a-e transmits the acquired interference characteristics to a controller device (e.g., IDL server 14) through the one or more affected cell basestations 18a-c and the backhaul network 12. Finally at block 58, the controller device (e.g., IDL server 14) may determine the location(s) and/or type of interference source 26a-b based on the nature of the acquired interference characteristics. In an embodiment the location of the interference may be determined based on geographic coordinates, triangulation, and/or interference measurements characteristics. In an embodiment the type of the interference may be determined based on an emitted frequency and/or a magnitude associated with a measured interference characteristic.

Figure 4:
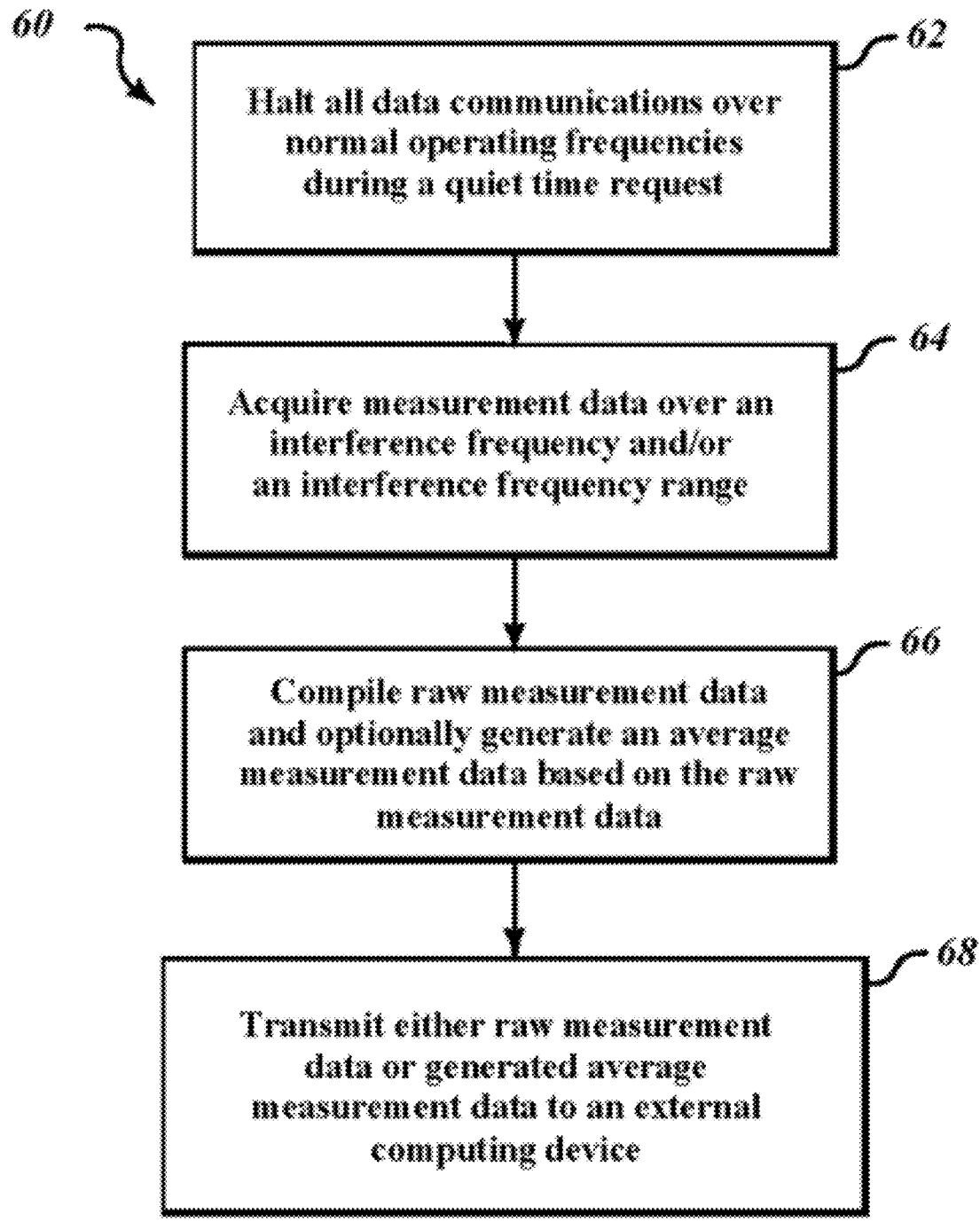
FIG. 4 illustrates a flow diagram of an interference source detection and measurement process in accordance with an embodiment of the present invention.

In accordance with an embodiment of the invention, FIG. 4 illustrates a flow diagram 60 associated with a client-side interference source detection and measurement process. At block 62, all data communications over normal operating frequencies are halted during a frequency-based quiet time request. During this quiet time, the distributed client devices 20a-e, 22a-c, and 24a-e in cells experiencing the quiet times typically do not communicate with cell basestations 18a-c during the quiet time period(s). Next at block 64, the affected distributed client devices 20a-e, 22a-c, and 24a-e acquire measurement data over an interference frequency or frequency spectrum of interest. Then at block 66, the distributed client devices 20a-e, 22a-c, and 24a-e compile the acquired raw measurement data and optionally generate an average measurement data based on the raw measurement data. In an embodiment, if multiple energy samples are measured and saved in client device RAM 38 the processor 36 of the client device 30 may determine an average or expected energy sample by implementing any number of well-know mathematical or statistical algorithms on the energy sample data (e.g., either a statistical mean or median value). Finally, at block 68, either the acquired raw measurement data or the generated average measurement data are transmitted to an external computing device utilizing the client device 30 transceiver 34.

Figure 5:
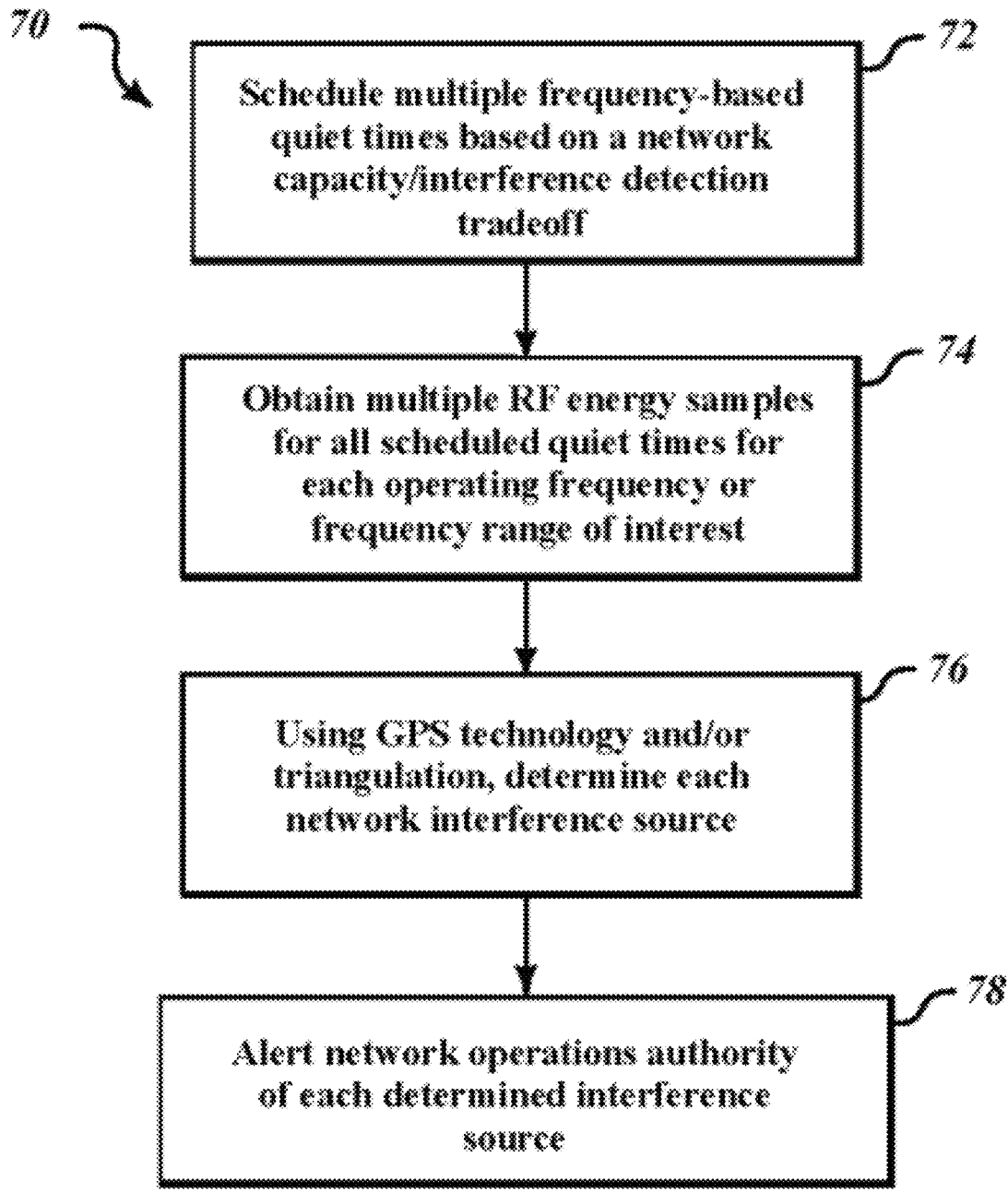
FIG. 5 illustrates a flow diagram of scheduled interference source detection and geographic location processes in accordance with an embodiment of the present invention.

In accordance with an embodiment of the invention, FIG. 5 illustrates a flow diagram 70 of scheduled interference source detection and geographic location processes. At block 72, a controller device (e.g., the RRM server 16) schedules multiple frequency-based quiet times based on a network capacity/interference detection tradeoff. Next at block 74, distributed client devices 20*a-e*, 22*a-c*, and 24*a-e* obtain multiple radio frequency energy samples for all the scheduled quiet times for each operating frequency or frequency range of interest. Then at block 76, using GPS technology and/or triangulation techniques, a controller device (e.g., IDL server 14) determines each network interference source within or between any of the network cells. Finally, at block 78, a network controller (e.g., IDL server 14 or RRM server 16) alerts a network operations authority of a precise location of each determined interference source. In various embodiments, the level of determined interference source location accuracy is feasible at distances having less than a half-mile radius. As would be understood by those skilled in the art, the level of both precision and accuracy can depend on both the number of the distributed client devices 20*a-e*, 22*a-c*, and 24*a-e* making measurements within a given cell or amongst multiple cells, and the number of measurement samples taken by each distributed client device 20*a-e*, 22*a-c*, and 24*a-e* taking the measurements. In highly client-populated network systems, the abundance of existing network resources, can offer a network provider nearly pin-point accurate interference source location determinations.

Related to the above network capacity/interference detection tradeoff, scheduled frequency-based quiet times inevitably reduce the overall capacity of a network since no downlink transmissions can take place during quiet times. Therefore, there exists a network capacity/interference detection tradeoff where the network controller (e.g., the RRM server 16) must decide when and how often to schedule the frequency-based quiet times. In order to maximize the probability of detecting an intermittent interference source 26*a-b*, it is advantageous to have as many quiet times as possible. However, the more quiet times that are scheduled, the greater the reduction in network capacity. The rate at which quiet times are scheduled can be adjusted by the operator or automatically according to QOS threshold value. In an embodiment the QOS value may be determined based on network and/or network cell throughput. Alternately, the QOS threshold may incorporate a probability of detecting a network interference source based on the nature of available measured interference data (e.g., whether the interference is static or intermittent)

Alternatively, the rate at which quiet times are scheduled can be automatically changed by a network controller (e.g., the RRM server 16) based on feedback received from another network controller (e.g., the IDL server 14) as to whether or not interference has been detected. If an intermittent interference is detected, then the network controller (e.g., the RRM server 16) can automatically increase the rate at which quiet times are scheduled in order to further pinpoint the location of the interference. The increase in the rate of quiet times may take place primarily on the frequencies on which the interference has been detected, or they can take place over all network frequencies. If interference is not detected for some time, the rate at which quiet times are scheduled may be decreased in order to increase network capacity.

In various embodiments, distributed client device 20*a-e*, 22*a-c*, and 24*a-e* may only be able to listen to a small set of frequencies at any one time. Further, when an interference source 26*a-b* is dynamic in nature (i.e., only intermittently present) the distributed client devices 20*a-e*, 22*a-c*, and 24*a-e* may need to make multiple, repeated measurements across a small set of specific interference frequencies. Under these scenarios, a scheduler device (e.g., the RRM server 16) may choose to schedule multiple, distinct quiet times to cover the entire set of frequencies utilized by a wireless network operator or multiple, distinct quiet times to repeatedly cover a small set of frequencies utilized by a known intermittent interference source.

In an embodiment, when a network controller device (e.g., the IDL server 14) receives interference data measured and/or averaged by the distributed client devices 20*a-e*, 22*a-c*, and 24*a-e*, that indicates there could be more than one interference source, the controller device (e.g., the IDL server 14) analyzes the received interference data to determine multiple interference source locations. In this case, the network controller device may alert the network authority of the location of both interference sources 26*a-b*.

When using GPS technology and/or triangulation to determine the location of an interference source 26*a-b*, the controller device (e.g., the IDL server 14) may use a known location of each of the distributed client devices 20*a-e*, 22*a-c*, and 24*a-e* to further help pin-point where the interference source 26*a-b* is located. The geographic coordinate location of a client device 30 may be obtained from either a GPS receiver, optionally embedded in the client device's transceiver unit 34, or it may be obtained using known triangulation methods (e.g., triangulation using known basestation 18*a-c* locations as reference points pertaining to points of a triangle and using measurements made from the network basestations 18*a-c* to determined a third triangular point location of a client device).

In various embodiments, interference measurement information that may be transmitted to a controller device (e.g., the IDL server 14) can be in one of many forms, such as a signal strength measurement or as a set of discrete digitized samples of an interference signal. If digitized samples are utilized, a controller device (e.g., the IDL server 14) may use known triangulation algorithms on the digitized samples to determine an interference source location 26*a-b*. In various embodiments it may be possible to characterize the type of interference source by analyzing the digital samples as different types of interference sources have characteristic "fingerprints". In this embodiment, the controller device (e.g., the IDL server 14) may compare the interference source characteristics to a database of interference source "fingerprints." If a comparative match is found, then the controller device may also be able to determine a type of equipment is causing the interference. This information may also be helpful to the process of determining where the interference equipment is located.

In an embodiment, if a controller device (e.g., the IDL server 14) detects that an external source is causing interference over a particular network cell, it may transmit a notification to technicians at a network operations center that the interference source(s) 26*a-b* has been detected, along with a precise estimate of a geographical location of where the interference source is likely located. Optionally, this notification can include interference equipment type information. The notification may be automated and it may take the form of an alarm sent to a network management system or a personal correspondence (e.g., a phone call, page, or email) sent to a technicians. In an embodiment, the same interference notification may be periodically transmitted until the interference source has been removed.

In a Frequency Division Duplexing (FDD) wireless system, a client device may only be capable of Half-Duplex FDD (H-FDD) operation (i.e., the client transmits and receives data communications on different frequencies, and cannot transmit and receive at the same time, as is the case with a full duplex FDD radio). Since H-FDD client devices cannot transmit data to a basestation while they are listening for interference during the downlink quiet times, it may be advantageous to schedule frequency-based quiet times on the uplink, during which times no client devices are allowed to transmit at the same time as the quiet times on the downlink. This allows basestations to make measurements of uplink interference at the same time as the subscriber terminals are measuring downlink interference levels. The basestations may send their uplink measurements to an IDL server 14 so that they can automatically determine if uplink interference exists, where it is geographically located, and then send a notification to a network technician when uplink interference is detected.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A data communications system associated with a network operator having a license to transmit data in a given frequency range, the system comprising:
   at least one base station;
   at least one controller device configured to communicate with the base station over a first network channel and instruct the base station to initiate a quiet time during which time no data is to be transmitted in the given frequency range by the base station; and
   a plurality of client devices, each client device having a transceiver and configured to communicate with the base station over a second network channel,
   wherein the at least one controller device is configured to issue an instruction to the client devices to acquire at least one interference characteristic associated with an interference source operating in the given frequency range.

2. The data communications system of claim 1, wherein the acquired at least one interference characteristic comprises a measured interference metric associated with the interference source, wherein the first network channel is a different medium than the second network channel.

3. The data communications system of claim 2, wherein the measured interference metric is an interference magnitude associated with the given frequency range for which the base station has been instructed not to transmit any data by the controller device.

4. The data communications system of claim 2, wherein the instruction further instructs the client devices to transmit the measured interference metric to the base station so that the controller device can receive the measured interference metric from the base station.

5. The data communications system of claim 4, wherein the controller device is further configured to determine a location of the interference source based on the transmitted measured interference metric.

6. The data communications system of claim 1, wherein the controller device is further configured to schedule the quiet time at a predetermined time that coincides with a time period within which the instruction is to be carried out by the client devices.

7. A computer-readable medium having computer readable instructions stored thereon, which when executed, perform a method for detecting an interference source within a data communication network associated with a network operator having a license to transmit data in a given frequency range, the method comprising:
   instructing a base station via a data communication link to initiate a quiet time wherein no data is to be transmitted in the given frequency range for a given time by the base station; and
   issuing an instruction to a plurality of client devices to acquire at least one interference characteristic associated with an interference source operating in the given frequency range, the instruction being issued using the base station over a wireless communication link,
   wherein each client device includes a transceiver and is configured to transmit and receive information from the base station.

8. The computer-readable medium of claim 7, wherein the acquired at least one interference characteristic comprises a measured interference metric associated with the interference source, wherein the data communication link is a wired or wireless link.

9. The computer-readable medium of claim 8, wherein the measured interference metric is an interference magnitude associated with the given frequency range for which the base station has been instructed not to transmit any data by the controller device.

10. The computer-readable medium of claim 8, wherein the instruction further instructs the client devices to transmit the measured interference metric to the base station so that the controller device can receive the measured interference metric from the base station.

11. The computer-readable medium of claim 10, wherein the controller device is further configured to determine a location of the interference source based on the transmitted measured interference metric.

12. The computer-readable medium of claim 7, wherein the controller device is further configured to schedule the quiet time at a predetermined time that coincides with a time period within which the instruction is to be carried out by the client devices.

13. A computer-implemented method for detecting an interference source within a data communication network associated with a network operator having a license to transmit data in a given frequency range, the method comprising:
   instructing a base station to initiate a quiet time during which time no data is to be transmitted in the given frequency range by the base station;
   issuing an instruction to a plurality of client devices to acquire at least one interference characteristic associated with an interference source operating in the given frequency range, the instruction being issued to the client devices via the base station over a wireless communication link, each client device including a transceiver and being configured to transmit and receive information from the base station; and receiving from at least one client device the acquired at least one interference characteristic associated with an interference source operating in the given frequency range during the quiet time.

14. The computer-implemented method of claim 13, wherein the acquired at least one interference characteristic comprises a measured interference metric associated with the interference source, and the controller device receives the acquired at least one interference characteristic from the base station.

15. The computer-implemented method of claim 14, wherein the measured interference metric is an interference magnitude associated with the given frequency range for which the base station has been instructed not to transmit any data during the quiet time.

16. The computer-implemented method of claim 14, wherein the measured interference metric received by the base station is transmitted to the controller device to determine the location of the interference source.

17. The computer-implemented method of claim 13, wherein the controller device is further configured to determine a location of the interference source based on the acquired at least one interference characteristic received from the at least one client device.

18. The computer-implemented method of claim 13, wherein the controller device is further configured to schedule the quiet time at a predetermine time that coincides with a time period within which the instruction is to be carried out by the client devices.

19. A method for detecting an interference source within a data communication network using a client device provided therein, the data communication network being associated with a network operator having a license to transmit data in a given frequency range, the client device having a wireless transceiver for receiving and transmitting information to one or more base stations, the method comprising:

receiving an instruction over a wireless link from a base station of the data communication network to scan for an interference source operating in the given frequency range during a scheduled quiet time when no data is to be transmitted on the given frequency range by the base station;

acquiring an interference characteristic associated with the interference source operating in the given frequency range during the scheduled quiet time; and transmitting the acquired interference characteristic associated with the interference source to the base station.

* * * * *